United States Patent [19]

Johnson et al.

[11] 4,094,532
[45] June 13, 1978

[54] TORSION BAR ADJUSTING DEVICE

[75] Inventors: William A. Johnson, Sylmar; Philip W. Pausmer, Newbury Park; Russel J. Harmon, Thousand Oaks, all of Calif.

[73] Assignee: Sway-A-Way Corporation, Van Nuys, Calif.

[21] Appl. No.: 796,966

[22] Filed: May 16, 1977

[51] Int. Cl. ............................................. B60g 11/20
[52] U.S. Cl. ...................................... 280/695; 267/57
[58] Field of Search ........ 280/695, 700, 721, 106.5 R; 267/57

[56] References Cited

U.S. PATENT DOCUMENTS

| | | | |
|---|---|---|---|
| 2,165,033 | 7/1939 | Dauben | 280/695 |
| 2,596,922 | 5/1952 | Thoms | 280/695 |
| 2,942,871 | 6/1960 | Kraus | 280/721 |
| 3,027,177 | 3/1962 | Karlstad | 280/695 |
| 3,685,854 | 8/1972 | Cadiou | 280/106.5 R |
| 4,033,605 | 7/1977 | Smith | 280/695 |

Primary Examiner—Robert R. Song
Attorney, Agent, or Firm—Ralph B. Pastoriza

[57] ABSTRACT

The torsion bar adjusting device comprises a frame structure defining a collar with a slot in its lateral wall. Within the collar are first and second torsion bar end receiving sockets each having integrally radially outwardly extending arms passing through the slot in the collar. These arms may be individually moved to impart a rotation to the socket portion within the collar over a given number of degrees within the confines of the width of the slot. The arrangement is such that a center section of the housing for the torsion bars associated with the left and right rear wheels respectively in an automobile suspension system can be cut out and the adjusting device substituted for the section with the inner ends of the torsion bars being received in opposite ends of the collar to be secured to the respective torsion bar end receiving sockets. Individual movement of the radially extending arms will then impart a further twist to the associated torsion bars and thereby enable quick adjustment of the "stiffness" of the suspension system.

3 Claims, 5 Drawing Figures

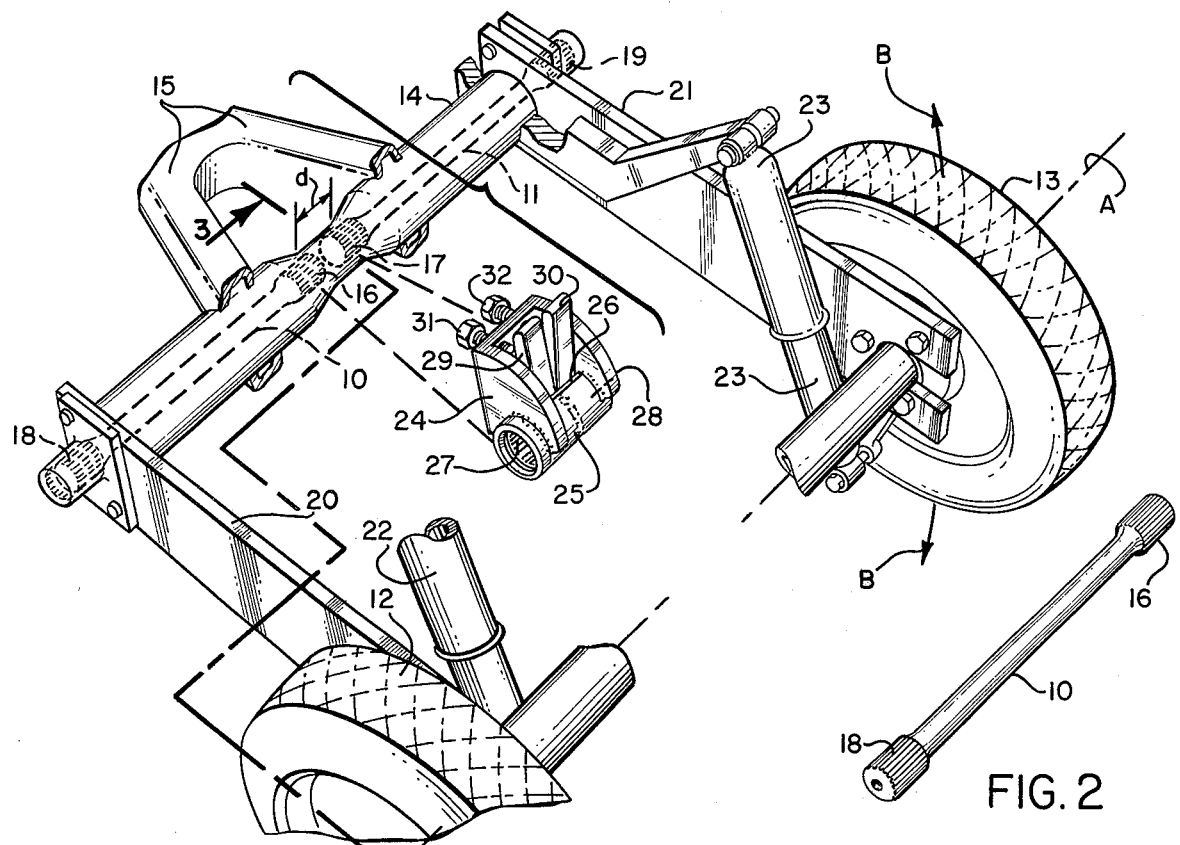
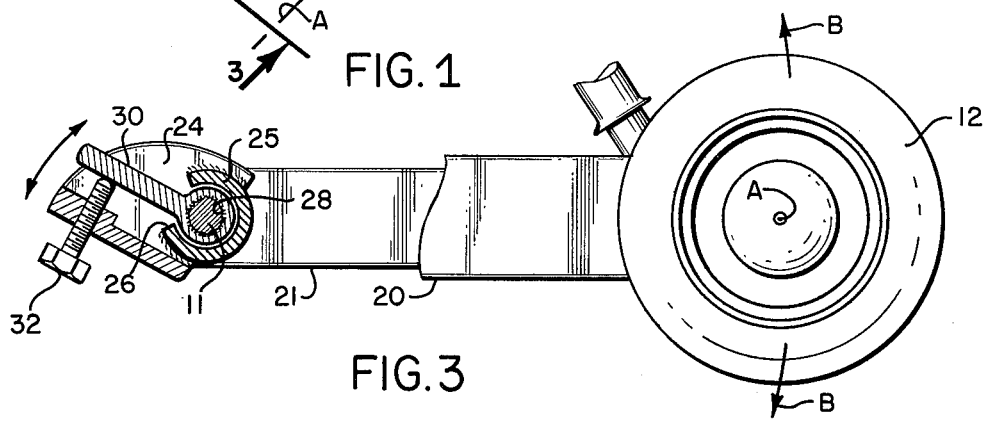
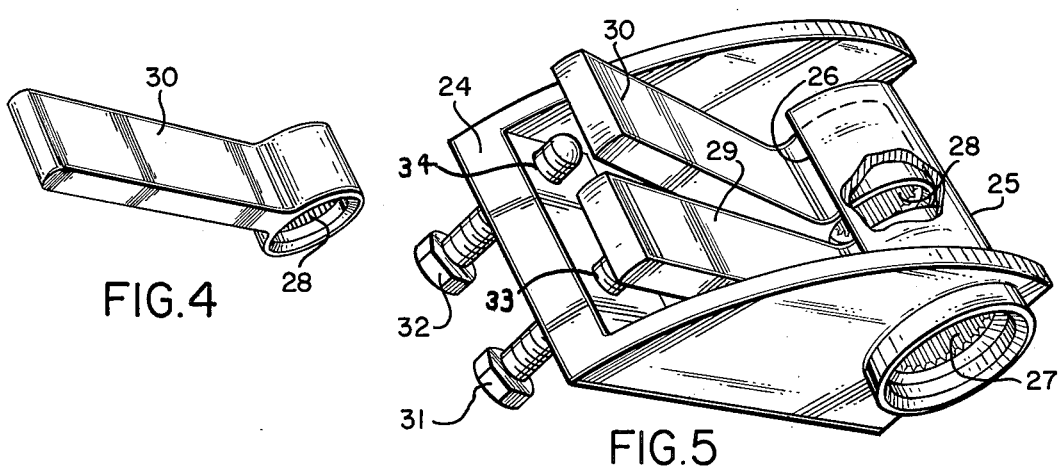

TORSION BAR ADJUSTING DEVICE

This invention relates generally to automobile suspension systems and more particularly to an improved torsion bar adjusting device designed for insertion in certain types of torsion bar suspension systems to facilitate adjustment of the system.

BACKGROUND OF THE INVENTION

Many cars and particularly racing cars are provided with rear torsion bar suspension systems utilizing individual torsion bars for the left and right rear wheels respectively. Generally, the torsion bars are axially aligned extending in directions generally parallel to the rear axes of the rear wheels and spaced ahead of the rear wheels. These bars are surrounded by a torsion bar housing tube fixed to the frame of the car. The inner ends of the torsion bars are secured to the housing tube and their oppositely extending outer ends secured to appropriate rear wheel supporting spring plates respectively. Up and down movement of each rear wheel is opposed by a twisting reaction torque from its associated torsion bar.

After prolonged use, the "stiffness" of the suspension system tends to decrease with the result that the rear wheels may swing through a sufficient up and down amplitude as to hit the frame structure of the car or even simply seat on the frame structure. Under these circumstances, it is necessary to "tighten up" the suspension system to restore the original "stiffness". The process of adjusting the individual torsion bars is quite cumbersome. Normally, the car frame must be jacked up, the rear wheels removed, the normal spring plates extending to the outer ends of the torsion bars removed and the individual torsion bars themselves removed from the housing. A greater initial bias or twisting force is then provided in each of the bars and reverse steps are taken in re-assemblying the suspension system and wheels on the car.

Many times after the foregoing adjustments have been made, it is found that too great a degree of "stiffness" has been provided in the suspension system. It is then again necessary to disassemble all of the various components and effect another adjustment to provide somewhat more resiliency; that is, some of the initial bias twist in the bars is reduced.

While more simple means for adjusting torsion bar suspension systems are known, for those types of automobiles or racing cars wherein the rear suspension torsion bars themselves are confined within a tube housing the various cumbersome steps outlined above are necessary.

BRIEF DESCRIPTION OF THE PRESENT INVENTION

With the foregoing in mind, the present invention contemplates a torsion bar adjusting device which may be manufactured and sold as a separate unit but which is so designed it may readily be incorporated in those types of automobiles having rear suspension systems in which at present adjustment of the torsion bars can only be achieved by disassembly of the entire suspension system. The arrangement of the present invention is such that it is only necessary to cut out a central portion of the torsion bar housing tube in the rear car suspension system and substitute in the device which is then secured permanently in place to the cut ends of the torsion bar housing. Once the device is in place, individual adjustment of each of the torsion bars can readily be effected without having to disassemble any portion of the system.

BRIEF DESCRIPTION OF THE DRAWINGS

A better understanding of this invention will be had by now referring to the accompanying drawings in which:

FIG. 1 is fragmentary perspective view, partly schematic in form of the rear torsion bar suspension system of a car such as a racing car wherein the torsion bar adjusting device of this invention can be utilized;

FIG. 2 is a perspective view of one of the torsion bars in the system of FIG. 1;

FIG. 3 is a sectional view of the suspension system of FIG. 1 with the torsion bar adjusting device of this invention in place looking generally in the direction of the dashed lines depicted by the arrows 3—3 of FIG. 1;

FIG. 4 is a perspective view of one of the adjustment elements incorporated in the device; and, FIG. 5 is an overall enlarged perspective view of the torsion bar adjusting device.

DETAILED DESCRIPTION OF THE PREFERRED EMBODIMENT

Referring first to FIG. 1, there is shown the rear suspension system of a car wherein the system includes two axially aligned independent torsion bars indicated by phantom lines at 10 and 11 extending in directions generally parallel to the rear wheel axes A—A for the rear wheels 12 and 13 ahead of the rear wheels. As shown, the torsion bars 10 and 11 are housed within a torsion bar housing tube 14 fixed to the frame of the car as by structural frame portions 15.

The inner ends of the torsion bars 10 and 11 indicated at 16 and 17 respectively, are secured to the housing tube and their oppositely extending outer ends 18 and 19 secured to rear wheel supporting spring plates 20 and 21 respectively. These springs plates 20 and 21 are coupled to the rear wheels 12 and 13 respectively as indicated adjacent to the shocks 22 and 23. The arrangement is such that up and down movement of the individual rear wheels such as indicated by the arrows B is opposed by a twisting reaction torque from the wheel's associated torsion bar.

As described briefly heretofore, if it is desired to make an adjustment of the "stiffness" of the suspension system it is necessary to disassemble the rear wheels and associated couplings 22 and 23 from the spring plates 20 and 21 and thereafter disconnect the spring plates from the outer ends of the torsion bars. The torsion bars can then be removed from the housing tube 14 and recoupled to the spring plates 20 and 21 in such a manner that when the suspension system is reassembled, there is a pre-twist or bias set into the torsion bars to provide for the greater stiffness of the suepension system.

As also described heretofore, if this initial adjustment is not proper, it is again necessary to disassemble the various components and repeat the adjustment.

In order to avoid the necessity of complete dis-assembly of the suspension system to effect appropriate adjustment in the torsion bars, the present invention provides an adjusting device which can readily be utilized in suspension systems of the type described in FIG. 1. This device is shown exploded away from the torsion bar housing tube 14 preparatory to being inserted. Generally, the device includes a frame structure 24 including a collar 25 having an elongated slot 26 parallel to its axis in its side wall.

Rotatably mounted within the collar 25 are first and second axially aligned torsion bar end receiving sockets 27 and 28 each having integral radially outwardly extending arms 29 and 30 passing through the slot 26.

The structure is completed by the provision of first and second arm engaging means on the frame each being individually adjustable to move an associated arm relative to the frame and thereby impart a rotation to the integral socket portion from which the arm extends within the collar through a number of degrees within the width of the slot.

With the foregoing arrangement, a short center section of the housing tube 14 such as defined by the center section length $d$ as shown in FIG. 1 can be cut out and the collar 26 of the device 24 secured to the housing tube in place of this section. The inner ends of the torsion bars are then received in opposite ends of the collar and respectively secured in the referred to first and second torsion bar end receiving sockets 27 and 28. The opposite ends of the collar 25 may be welded to the cut exposed circular peripheral ends of the housing tube 14 so that the device 24 is fixed to the housing tube 14 and thus is stationary relative to the housing tube and frame structure 15 of the automobile frame.

It will now be readily apparent that a pre-twist may be inserted into each of the torsion bars 10 and 11 independently by appropriate movement of one or the other of the arms 29 and 30 as by the arm engaging means. In the embodiment illustrated in FIG. 1, this arm engaging means takes the form of threaded bolts 31 and 32 all as will become clearer as the description proceeds.

FIG. 2 shows in full perspective view the torsion bar 10 wherein it will be noted that the inner and outer ends 16 and 18 respectively are splined for securement to the torsion bar end receiving socket 27 and spring plate 20 when the device 24 is assembled in position in FIG. 1. The use of splines is not essential. In many types of torsion bar suspension systems, other coupling means are provided such as non-circular configurations or the like on the ends of the torsion bar to permit a set twist or bias to be applied thereto.

In FIG. 3, the left portion is shown in cross section taken through the center of the collar 25 of the device after it has been inserted in the torsion bar housing tube 14 of FIG. 1. Thus, the second torsion bar end receiving socket 28 is clearly visible with the inner end of the torsion bar 11 received therein, the integrally extending arm 30 being shown as passing through the slot 26 in the collar 25. It will be appreciated that threaded adjustment of the bolt 32 will move the arm 30 to impart a desired pre-twisting to the torsion bar 11 and further that access to the bolt 32 is readily had without the necessity of jacking up the car frame or disassemblying any of the suspension system components.

FIG. 4 shows one of the torsion bar end receiving sockets such as the socket 28 with its integrally extending arm 30 separated from the device in perspective view. The other torsion bar end receiving socket 27 and its associated arm 29 as described in FIG. 1 is substantially identical in appearance.

FIG. 5 shows an enlarged perspective taken from a slightly different angle of the device 24 described in FIG. 1. Corresponding parts of the device are designated by the same numerals used in FIG. 1. In FIG. 5, the arm adjusting means is more clearly shown wherein there are provided threaded openings 33 and 34 in the frame portion 24 for receiving the adjusting bolts 31 and 32 respectively. Further, the degree of pre-bias or twist for each of the torsion bars receivable in the torsion bar end receiving sockets 27 and 28 within the collar 25, respectively can be independently adjusted as indicated by the difference in the degree of movement of the arms 29 and 30. Normally, of course, the amount of pre-twist or bias is equal provided that the torsion bars in question have the same spring characteristics.

The overall degree of adjustment of each of the individual torsion bars as a consequence of varying of the extending ends of the bolts 31 and 32 against the underside of the arms 29 and 30 respectively is limited by the width of the slot 26 and the collar 25. However, the width of this slot 26 is sufficient that the normal number of degrees required for adjustment is well accommodated.

From all of the foregoing, it will be evident that the present invention has provided an extremely useful torsion bar adjusting device readily adaptable to certain types of suspension systems such as described in conjunction with FIG. 1.

We claim:

1. A torsion bar adjusting device for insertion in the rear torsion bar suspension system of a car wherein said system includes two axially aligned independent torsion bars extending in directions generally parallel to the rear wheel axes ahead of the rear wheels within a torsion bar housing tube fixed to the frame of the car with the inner ends of the torsion bar secured to the housing tube and their oppositely extending outer ends secured to rear wheel supporting spring plates respectively, so that up and down movement of each rear wheel is opposed by a twisting reaction torque from its associated torsion bar, said device comprising, in combination:

(a) a frame structure including a collar having an elongated slot parallel to its axis in its side wall;

(b) first and second axially aligned torsion bar end receiving sockets rotatable within said collar and having integral radially outwardly extending arms passing through said slot; and (c) First and second arm engaging means on said frame each being individually adjustable to move an associated arm relative to said frame and thereby impart a rotation to the integral socket portion from which the arm extends within said collar through a number of degrees within the width of said slot whereby a short center section of said housing tube in the suspension system of said car can be cut out and the collar of said device secured to the housing tube in place of said section with the inner ends of said torsion bars being received in opposite ends of said collar and respectively secured in said first and second torsion bar end receiving sockets, operation of said arm engaging means imparting a twisting force into the torsion bars to thereby enable adjustment of the spring force provided by said torsion bar suspension system to each of the rear wheels of the car respectively.

2. A device according to claim 1, in which the ends of the torsion bars are splined, said torsion bar receiving sockets having mating splines for receiving and securing said inner ends of said torsion bars.

3. A device according to claim 1, in which said frame includes first and second threaded openings spaced below the outer extending end portions of said arms, said first and second arm engaging means comprising first and second threaded bolts extending through said threaded openings respectively for engaging the outer underside portions of said arms, individual threaded adjustment of said bolts moving said arms respectively to impart said rotation to the integral socket portions from which the arms extend.

* * * * *